(12) United States Patent
Top et al.

(10) Patent No.: US 10,296,592 B2
(45) Date of Patent: May 21, 2019

(54) SPHERICAL VIDEO IN A WEB BROWSER

(71) Applicant: Google Inc., Mountain View, CA (US)

(72) Inventors: Andrew Top, San Francisco, CA (US); Anjali Wheeler, Pacifica, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 15/670,710

(22) Filed: Aug. 7, 2017

(65) Prior Publication Data

US 2019/0042582 A1 Feb. 7, 2019

(51) Int. Cl.
*G06T 15/20* (2011.01)
*G06F 17/30* (2006.01)
*G06F 3/0481* (2013.01)

(52) U.S. Cl.
CPC .... G06F 17/30061 (2013.01); G06F 3/04815 (2013.01); G06F 17/30861 (2013.01); G06T 15/20 (2013.01)

(58) Field of Classification Search
CPC .............................. G06T 15/00; G06T 2200/04
USPC .......................................................... 345/419
See application file for complete search history.

(56) References Cited

U.S. PATENT DOCUMENTS

| 2010/0013842 | A1* | 1/2010 | Green | G06T 15/005 |
| | | | | 345/522 |
| 2012/0007862 | A1* | 1/2012 | Shefi | G06T 11/206 |
| | | | | 345/419 |
| 2013/0120418 | A1 | 5/2013 | Green et al. | |
| 2013/0304791 | A1 | 11/2013 | Brutch et al. | |
| 2015/0143302 | A1* | 5/2015 | Chang | G06F 3/04815 |
| | | | | 715/849 |
| 2015/0243085 | A1* | 8/2015 | Newhouse | G06T 19/006 |
| | | | | 345/633 |

OTHER PUBLICATIONS

International Search Report and Written Opinion dated Sep. 5, 2018, on application No. PCT/US2018/040453.
Thiago Pontes et al., "Building a Cross Platform 360-degree Video Experence at the New York Times", The New York times, Nov. 11, 2016 (Nov. 11, 2016), pp. 1-5.
Rovshen Nazarov et al., "Native Browser Support for 3D rendering and physics using WebGL, HTML5 and Javascript", Proceeding of the Sixth Balkan Conference in Informatics, Thessalonik, Greece, Sep. 19-21, 2019, pp. 21-24.

* cited by examiner

*Primary Examiner* — Thomas J Lett
(74) *Attorney, Agent, or Firm* — Lowenstein Sandler LLP

(57) ABSTRACT

Implementations disclose methods and systems for rendering, by a browser, a content item projected on a mesh. A method includes providing, by a browser executing on a user device, an application programming interface (API) to communicate with a web application that includes a user interface to present a content item on the user device; receiving, by the browser from the web application via the API, an instruction to project the content item on a mesh, where the instruction identifies the content item and the mesh; rendering, by the browser and without involvement of the web application, a first frame of the content item projected on the mesh in a first orientation; and causing, by the browser, the rendered first frame to be displayed on the user device.

20 Claims, 5 Drawing Sheets

111
SPHERICAL VIDEO IN A WEB BROWSER

TECHNICAL FIELD

This disclosure relates to the field of rendering a content item and, in particular, rendering a content item projected on a mesh.

BACKGROUND

A web application may receive a user request to display a content item projected on a mesh, such as a 360-degree video projected on a spherical mesh. The web application may render frames of the content item projected on the mesh and display the rendered frames on a user device.

SUMMARY

Aspects of the present disclosure improve rendering technology by providing, by a browser, an application programming interface (API) and receiving, by the browser via the API from a web application, an instruction to project a content item on a mesh. The browser renders frames of the content item projected on the mesh based on the instruction. The browser may receive and mappings of user input to orientations via the API from the web application and render frames of the content item projected on the mesh in different orientations further based on the mappings and user input.

BRIEF DESCRIPTION OF THE DRAWINGS

The present disclosure is illustrated by way of example, and not by way of limitation, in the figures of the accompanying drawings.

DETAILED DESCRIPTION

Figure 1:
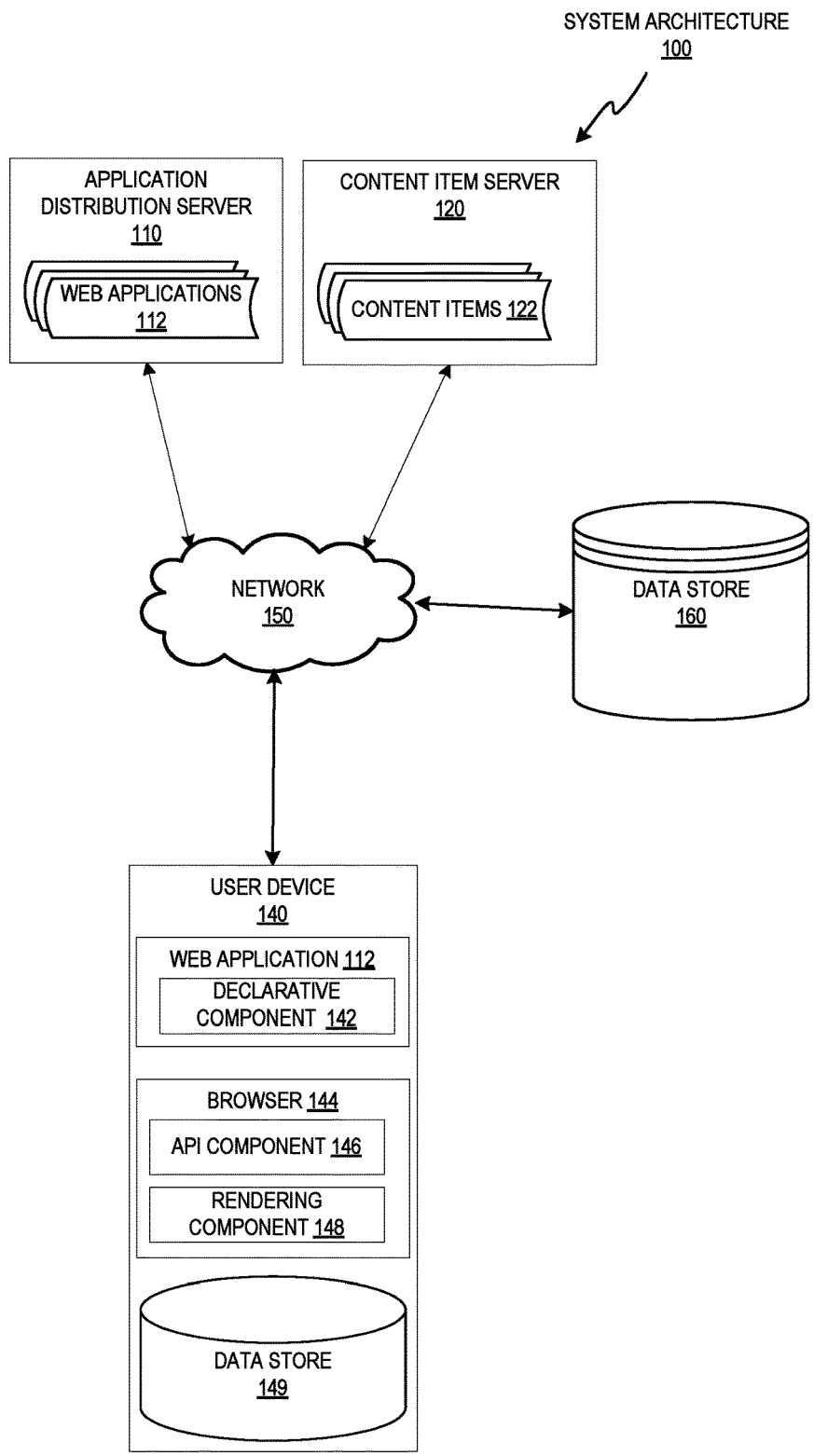
FIG. 1 is a block diagram illustrating an exemplary system architecture, in accordance with an implementation of the disclosure.

Aspects and implementations of the disclosure are directed to rendering a content item projected on a mesh. Content providers may provide content items (e.g., a 360-degree video, a user interface (UI) including three-dimensional (3D) UI elements, etc.) that are to be presented on a user device as a content item projected on a mesh. For example, a 360-degree video captured by a 360-degree video camera may be presented on a user device by projecting the 360-degree video on an inner surface of a spherical mesh. A 360-degree camera refers to a camera or set of cameras that has approximately a 360-degree field of view (e.g., a visual field that covers a substantial portion of a three-dimensional object, such as a sphere). In response to user input provided via the user device (e.g., a gesture, a selection of a button or other graphical user interface (GUI) element, a thumbstick movement, a change in orientation of a headset, etc.), the orientation or view of a content item projected on a mesh may change. For example, a user device may present a 360-video projected on an inner surface of a spherical mesh in a first orientation (e.g., a view of a central portion of the 360-video) and in response to user input of thumbstick movement to the left, the user device may present the 360-video projected on the inner surface of the spherical mesh in a second orientation that is to the left of the first orientation.

A content item projected on a mesh may be presented in a user interface on a user device (network-connected television device, set-top-box, low-power device, computer, smart phone, tablet, etc.). The user interface may be provided by an application which may be a native application or a web application. A native application is downloaded on a user device through an application distribution server (e.g., app store), runs directly on the user device without using a browser, and may run without network connectivity. A web application is launched by a browser sending a uniform resource locator (URL) to a server and receiving high level programming code (e.g., JavaScript) from the server to execute the web application. Portions of the web application (e.g., user interface) may run on the user device and portions of the web application may run on the server.

Web applications may have some advantages over native applications. For example, web applications have a common code base across multiple platforms (e.g., operating systems) and multiple user devices, so a web application can more easily be used on or adapted to multiple platforms and different user devices than a native application. A different native application may need to be created for each platform and type of user device. A web application may be more easily updated than a native application since portions of the web application run on the server and are not downloaded on the user device. A native application may be downloaded in its entirety on the user device through an application distribution platform (e.g., an app store) and making updates to the native application may include prompting users to download a new version of the native application through the app store. Because a native application is downloaded on a user device in its entirety, it may take up more memory or storage on the user device than a web application.

A web application may execute on a user device by using a high level programming code (e.g., JavaScript). The web application may run the high level programming code for each operation or functionality of the web application. To render a content item projected on a mesh, the high level programming code may be ran to render each frame or about sixty times per second. The user device may not be capable of running the high level programming code sixty times per second. This may cause skipping of frames, delay in presentation of the frames, delay in other functionalities of the web application, poor quality of presentation of the content item, delay in changing of orientation of the content item in response to user input, not having a smooth transition between orientations, etc. In one example, rendering, by a web application, of a 360-degree video projected on a mesh may produce a jittery video (e.g., skipping frames, delay between some of the frames, etc.). In another example, providing continuous user input of a left toggle to render, by the web application, a first frame of the 360-degree video projected on the mesh in a first orientation, followed by a second frame in a second orientation to the left of the first orientation, etc. may produce a jittery video with jittery transitions between frames and orientations of frames (e.g., frames are dropped, not a smooth transition between orientations, delay in transition between orientations, delay in changing orientations, etc.).

The user device may not be capable of running the high level programming code sixty times per second to render the content item and simultaneously running the high level programming code to provide the other operations or functionalities of the web application (e.g., receive, process, and respond to user input, etc.). For example, the user device may not be able to render, via the web application, the content item projected on a mesh and simultaneously provide a messaging functionality via the web application. This generates a delay in the rendered content item or a delay in the other operations and functionalities of the web application.

Aspects of the present disclosure address the above and other deficiencies by providing a technology that provides a browser-based API, and involves a browser receiving an instruction from a web application via the API, and the browser rendering the frames of a content item projected on a mesh. A web application may provide a user interface on the user device and receive, via the user interface, user input selecting a content item that is to be projected on a mesh. The web application may transmit a request to a server and receive the content item from the server. The web application may determine a mesh for the content item and transmit an instruction, via the API to the browser, to project the content item on the mesh. The web application may also transmit, via the API to the browser, mappings of user input to orientations. The browser may render (without involvement of the web application) a first frame of the content item projected on the mesh in a first orientation and cause the first frame to be displayed in the user interface on the user device. The browser may receive user input corresponding to a second orientation, render (without involvement of the web application) a second frame of the content item projected on the mesh in a second orientation, and cause the second frame to be displayed in the user interface on the user device. The browser may operate using a more efficient programming code (e.g., C++ code) than the high level programming code (e.g., JavaScript) used by the web application, which can make rendering via the browser be more efficient than rendering via the web application. The rendering may occur on a different thread than the execution of the web application logic. By executing the rendering on a different thread, the rendering may run (e.g., at 60 frames per second) independent of the web application logic (e.g., JavaScript execution). Using the browser to render the frames and adjust the orientation reduces the use of the less efficient high level programming code (e.g., JavaScript) while still having the advantages of providing the user interface through a web application.

Rendering the frames and changing orientation of the frames at the browser instead of at the web application is advantageous because it provides a smoother and better quality user experience by reducing skips in frames, reducing delay in response to change in orientation, and reducing interference with other functionalities of the web application. This improves overall user experience and user engagement with content items projected on a mesh. In addition, aspects of the present disclosure result in significant reduction of energy consumption (e.g., battery consumption) and latency because rendering frames in different orientations at the browser (e.g., on a different thread than the execution of the web application) uses a more efficient programming code (e.g., C++ code instead of JavaScript). Aspects of the present disclosure further result in reduction of computational (processing) resources because the rendering and updating of orientation is removed from the web application and is more efficiently executed in the browser (e.g., on a different thread than the execution of the web application).

FIG. 1 illustrates an example system architecture 100, in accordance with one implementation of the disclosure. The system architecture 100 includes application distribution server 110, content item server 120, network 150, data store 160, and user device 140.

Application distribution server 110 may be one or more computing devices (such as a rackmount server, a router computer, a server computer, a personal computer, a mainframe computer, a laptop computer, a tablet computer, a desktop computer, etc.), data stores (e.g., hard disks, memories, databases, etc.), networks, software components, and/or hardware components. The application distribution server 110 may be used to provide a user with access to web applications 112 (e.g., the application distribution server 110 may host web applications 112). The application distribution server 110 may provide the corresponding code (e.g., JavaScript), images, etc. to the user device 140 to execute a web application 112 in response to receiving a request from the user device 140 (e.g., via the browser 144) for the web application 112. The application distribution server 110 may provide portions of the web application 112 to the user device 140 (e.g., a selectable icon to launch the web application 112) in response to purchasing the web application 112. Application distribution server 110 may be part of an application distribution platform (e.g., application distribution service) that may allow users to consume, develop, upload, download, rate, share, search for, approve of ("like"), dislike, and/or comment on applications 112. The application distribution platform may also include a website (e.g., a webpage) or application back-end software that may be used to provide a user with access to the web applications 112. The application distribution server 110 may be a high level programming code server (e.g., a JavaScript server) that receives requests for high level programming code (e.g., JavaScript for web applications 112) from a user device 140 and provides the high level programming code to the user device 140 to execute a web application 112 on the user device.

Application distribution server 110 may host content, such as web applications 112. Web applications 112 may be digital content chosen by a user, digital content made available by a user, digital content developed by a user, digital content uploaded by a user, digital content developed by a content provider (e.g., application developer), digital content uploaded by a content provider (e.g., application developer), digital content provided by the application distribution server 110, etc. Examples of web applications 112 include, and are not limited to, mobile applications, smart television applications, desktop applications, software applications, etc. Web applications 112 may display social media updates, digital video, digital movies, digital photos, digital music, website content, social media updates, electronic books (eBooks), electronic magazines, digital newspapers, digital audio books, electronic journals, web blogs, real simple syndication (RSS) feeds, electronic comic books, software applications, etc. Web applications 112 may provide operations and functionalities such as messaging functionalities, sharing functionalities, rating functionalities, purchasing functionalities, inviting functionalities, scrolling functionalities, playback functionalities, etc. The operations and functionalities of web applications 112 may be executed using a high level programming code (e.g., JavaScript).

Applications 112 may be launched on user device 140 via a browser 144 executing on the user device 140. As used herein, "web application," "application," "web page,"

"mobile application," "smart television application," "desktop application," "software application," "digital content," and "content," can include an electronic file that can be executed or loaded using software, firmware or hardware configured to present content to and/or receive from and process input of an entity. In one implementation, the application distribution platform may store the web applications 112 using the data store 160. Applications 112 may be presented to and/or loaded by a user of user device 140 from application distribution server 110 or an application distribution platform. According to aspects of the disclosure, a web application 112 may allow users to interact with a prompt, watch content, make a purchase, participate in a conversation, etc. Web application 112 may include an embedded media player (as well as other components) to play content provided by a content platform, provided by content item server 120, or stored locally. The content platform (not shown) may be, for example, a media sharing platform or a social networking platform, and may be used to provide a user with access to media items and/or provide the media items to the user. For example, the content platform may allow a user to consume, upload, search for, approve of ("like"), dislike, and/or comment on media items. Application distribution server 110 may be part of the content platform, be an independent system or be part of a different platform.

Application distribution server 110 may host a set of web applications 112 that are each formatted for a corresponding device, a corresponding operating system, a corresponding version of operating system, a corresponding browser, a corresponding size of user interface, etc. The set of web applications 112 may have a common code base across multiple platforms (e.g., operating systems) and multiple user devices. The web application 112 may be associated with the content platform (e.g., a media sharing platform or a social networking platform) and may present content provided by the content platform. In response to a user device 140 transmitting a request for a web application 112 associated with the content platform, the application distribution server 110 may identify a web application 112 that is associated with the content platform and corresponds to the user device 140 (e.g., corresponds to the type of device, type of operating system, type of browser, etc. of user device 140), and transmit the web application 112 to the user device 140. In some implementations, two or more web applications 112 may be linked to the same account on the content platform.

In some implementations, system architecture 100 may also include a content item server 120 coupled to user device 140 via network 150 to facilitate rendering of content item 122 projected on a mesh. In one implementation, content item server 120 may be part of the content platform. In some implementations, content item server 120 may be part of the application distribution server 110.

In some implementations, content item server 120 may be an independent platform including one or more computing devices (such as a rackmount server, a router computer, a server computer, a personal computer, a mainframe computer, a laptop computer, a tablet computer, a desktop computer, etc.), data stores (e.g., hard disks, memories, databases, etc.), networks, software components, and/or hardware components. The content item server 120 may be used to provide a user with access to content items 122. The content item server 120 may provide the content items 122 to the user (e.g., a user may select a content item 122 and stream the content item 122 from the content item server 120 in response to requesting or purchasing the content item 122). Content item server 120 may be a part of a content platform (e.g., a content hosting platform providing a content hosting service) that may allow users to consume, develop, upload, download, rate, share, search for, approve of ("like"), dislike, and/or comment on content items 122. The content platform may also include a website (e.g., a webpage) or application back-end software that may be used to provide a user with access to the content items 122.

Content item server 120 may host content, such as content items 122. Content items 122 may be digital content chosen by a user, digital content made available by a user, digital content developed by a user, digital content uploaded by a user, digital content developed by a content provider (e.g., application developer), digital content uploaded by a content provider, digital content provided by the content item server 120, etc. Examples of content items 122 include, and are not limited to, 360-degree content items (e.g., 360-degree video, 360-degree UI, etc.), 3D content items (e.g., 3D video, UI including 3D UI elements, 3D 360-degree video, etc.) video items (e.g., digital video, digital movies, etc.), audio items (e.g., digital music, digital audio books, etc.), games, advertisements, social media updates, digital photos, website content, social media updates, electronic books (eBooks), electronic magazines, digital newspapers, electronic journals, web blogs, real simple syndication (RSS) feeds, electronic comic books, etc. In some implementations, content item 122 may be a 360-degree content item that is a map projection (e.g., a projection that maps meridians to vertical straight lines of constant spacing, maps circles of latitude to horizontal straight lines of constant spacing). The 360-degree content item may be an equirectangular projection, a cylindrical projection, a pseudocylindrical projection, a pseudoazimuthal projection, a conic projection, a pseudoconical projection, an azimuthal projection, etc. The content item 122 may have distortions when not projected on a mesh.

In one implementation, a 360-degree content item is captured by an omnidirectional camera or a collection of cameras and uploaded to the content item server 120. In another implementation, the 360-degree content item is rendered by a user device and uploaded to the content item server 120. The different orientations of a 360-degree content item may be coded into one stream. During presentation (e.g., playback) of a 360-degree content item, a user can control viewing direction (e.g., like a panorama) of the 360-degree content item. A first portion of the 360-degree content item may be displayed via a user interface in a first frame. In response to user input provided via the user device (e.g., a gesture, a selection of a button or other graphical user interface (GUI) element, a thumbstick movement, a change in orientation of a headset, etc.), a second portion of the 360-degree content item that is different than the first frame (e.g., to the left, right, up, or down from the first frame) may be displayed via a user interface in a second frame.

In one implementation, a 3D content item is captured by a depth-aware camera and uploaded to the content item server 120. In another implementation, a 3D content item is rendered by a user device and is uploaded to the content item server 120. During presentation (e.g., playback) of a 3D content item, a user can control viewing direction of the 3D content item (e.g., view the 3D content item from a different angle) or orientation of the 3D content item (e.g., rotate the 3D content item). For example, the 3D content item may be an object (e.g., a figurine, an avatar, a representation of the user) and the view of the object may displayed from a first angle via the user interface in a first frame. A second view of the object (e.g., after rotating the object, after changing the angle of view, etc.) may be displayed via the user interface in a second frame in response to user input. In another implementation, a 3D content item is captured by two or more lenses (e.g., or one lens in two or more orientations). A 3D content item may be displayed via a headset by presenting a first content item projected on a mesh to a first eye and presenting a second content item projected on a mesh to a second eye. The first and second content items may be captured by two different lenses or the same lens in two different locations.

A 3D 360-degree content item may be a combination of a 360-degree content item and a 3D content item. For example, a 3D 360-degree content item may be captured by an omnidirectional camera or a collection of cameras. In one implementation, the omnidirectional camera is a depth-aware camera or a collection of depth-aware cameras. In another implementation, the 3D 360-degree content item is displayed via a headset by presenting a first 360-degree content item projected on a mesh to a first eye and presenting a second 360-degree content item projected on a mesh to a second eye Content items 122 may be consumed via a browser 144 executing on the user device 140 or via a web application 112 executing on the user device 140 via an app store. As used herein, "digital content," "content," "content item," "video item," "audio item," "game," and "advertisement" can include an electronic file that can be executed or loaded using software, firmware or hardware configured to present the content item 122 to an entity. In one implementation, the content platform may store the content items 122 using the data store 160. Content items 122 may be presented to or downloaded by a user of user device 140 from content item server 120 (e.g., a content platform such as a content hosting platform). According to aspects of the disclosure, content items 122 may allow users to interact with a prompt, watch content, make a purchase, participate in a conversation, etc. Content items 122 may be played via an embedded media player (as well as other components) provided by a content platform or stored locally. The content platform may be, for example, a content hosting platform, or a social networking platform, and may be used to provide a user with access to content items 122 or provide the content items 122 to the user.

User device 140 may include computing devices such as network-connected television device ("smart TV"), a smart TV chip, network-connected media players (e.g., Blu-ray player), a set-top-box, over-the-top (OTT) streaming devices, operator boxes, personal computers (PCs), laptops, mobile phones, smart phones, tablet computers, netbook computers, etc. User device 140 may be capable of receiving (e.g., receiving JavaScript to execute) web applications 112 from application distribution server 110 and content items 122 from content item server 120 over a network 150.

Network 150 may be a public network that provides user device 140 with access to application distribution server 110, content item server 120, and other publically available computing devices. Network 150 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, and/or a combination thereof.

User device 140 may include an operating system that allows users to execute a browser 144 and web applications 112. The web application 112 may provide a user interface to present images, videos, audio, web pages, documents, etc.

The browser 144 may access, retrieve, present, and/or navigate web applications 112 (e.g., web pages such as Hyper Text Markup Language (HTML) pages) served by an application distribution server 110 and content items 122 (e.g., digital media items, text conversations, notifications, etc.) served by a content item server 120. The browser 144 or web application 112 may render, display, and/or present the content to a user and may provide an embedded media player (e.g., a Flash® player or an HTML5 player) (e.g., embedded in a web page that may provide information about a product sold by an online merchant).

In the example shown in FIG. 1, user device 140 may execute a web application 112 that has a declarative component 142. User device 140 may execute a browser 144 that has an API component 146 and a rendering component 148. Browser 144 may be a web browser. Browser may execute on the operating system of the user device 140. Browser 144 may execute using a more efficient programming code (e.g., C++) than the programming code of web applications 112 (e.g., JavaScript). Browser 144 may receive user input of a URL that represents a web application, transmit the URL via network 150 to application distribution server 110, and receive code (e.g., JavaScript) to launch web application 112 from the application distribution server 110.

API component 146 of browser 144 may provide an API to communicate with web application 112. Declarative component 142 of web application 112 may receive a content item 122, determine a mesh, and transmit, via the API to the browser 144, an instruction to project the content item 122 on the mesh. The web application 112 may also transmit mappings of user input to orientations via the API to the browser 144. The web application 112 may use a declarative approach in transmitting of the instruction and mappings instead of an imperative approach. Through a declarative approach, the web application 112 may indicate to the browser 144 what result is to happen (e.g., provide rendered frames) and the browser 144 determines how to provide the result (e.g., the browser 144 renders the content item 122 projected on a mesh in an orientation, the browser 144 uses a filter extension of the browser 144 to map the content item 122 to the mesh, the browser 144 renders the content item 122 projected on a mesh by using a different thread than a thread used to execute the web application). Through an imperative approach, the web application 112 would indicate to the browser 144 how the result is to happen (e.g., the web application 112 performs the rendering or indicates to the browser 144 how the rendering is to be performed). Rendering component 148 of browser 144 may render (without involvement of the web application 112) a first frame of the content item 122 projected on the mesh in a first orientation, receive user input of a second orientation, and render (without involvement of the web application 112) a second frame of the content item 122 projected on the mesh in the second orientation. The browser 144 may receive the instructions and mappings from the web application 112 in a first instance and the browser 144 may subsequently render frames of the content item 122 projected on the mesh in different orientations without receiving additional instructions and without receiving additional mappings.

In some implementations, the browser 144 rendering frames without involvement of the web application 112 includes the browser 144 rendering frames in different orientations based on the initial instruction and the initial mappings received prior to rendering the first frame. In some implementations, the browser 144 rendering frames without involvement of the web application includes the browser 144 rendering frames without receiving additional instructions or additional mappings after the rendering of the first frame. In some implementations, the browser 144 rendering frames without involvement of the web application includes the browser 144 rendering frames without executing the high level programming code (e.g., JavaScript) of the web application 112. In some implementations, the browser 144 rendering frames without involvement of the web application includes the browser 144 rendering frames by using a different thread than the thread used to execute the web application.

In some implementations, the web application 112 downloads the mesh and the web application 112 and identifies the mesh to the browser 144 via the API (e.g., transmits a URL of the mesh to the browser 144). The web application 112 may download the mesh from application distribution server 110, content item server 120, a mesh server, etc.

Data store 149 may be a memory (e.g., random access memory), a drive (e.g., a hard drive, a flash drive), a database system, or another type of component or device capable of storing data. Data store 149 may include multiple storage components (e.g., multiple drives or multiple databases) that may span multiple computing devices (e.g., multiple server computers).

In general, functions described in one implementation as being performed by the application distribution server 110 can also be performed on the user device 140 or content item server 120, in other implementations if appropriate. In addition, the functionality attributed to a particular component can be performed by different or multiple components operating together. The application distribution server 110 can also be accessed as a service provided to other systems or devices through appropriate application programming interfaces, and thus is not limited to use in websites.

In general, functions described in one implementation as being performed on the user device 140 can also be performed by the application distribution server 110 and/or content item server 120 in other implementations, if appropriate. For example, the content item server 120 may determine or transmit a mesh to the user device 140. In another example, the content item server 120 may provide the instruction to project the content item 122 on the mesh to the browser 144. In another example, the content item server 120 may provide the mappings of user input to orientations to the browser 144.

In addition, the functions of a particular component can be performed by different or multiple components operating together. The application distribution platform, application distribution server 110, and content item server 120 can also be accessed as a service provided to other systems or devices through appropriate application programming interfaces (API), and thus is not limited to use in websites and applications.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline of the application distribution platform.

Although implementations of the disclosure are discussed in terms of an application distribution server 110, content item server 120, an application distribution platform, and a content platform, implementations may also be generally applied to any type of social network providing content and connections between users.

In situations in which the systems discussed here collect personal information about users, or may make use of personal information, the users may be provided with an opportunity to control whether the application distribution platform collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the application distribution platform and content platform and what user information is transmitted to the application distribution server 110 and content item server 120.

Figure 2:
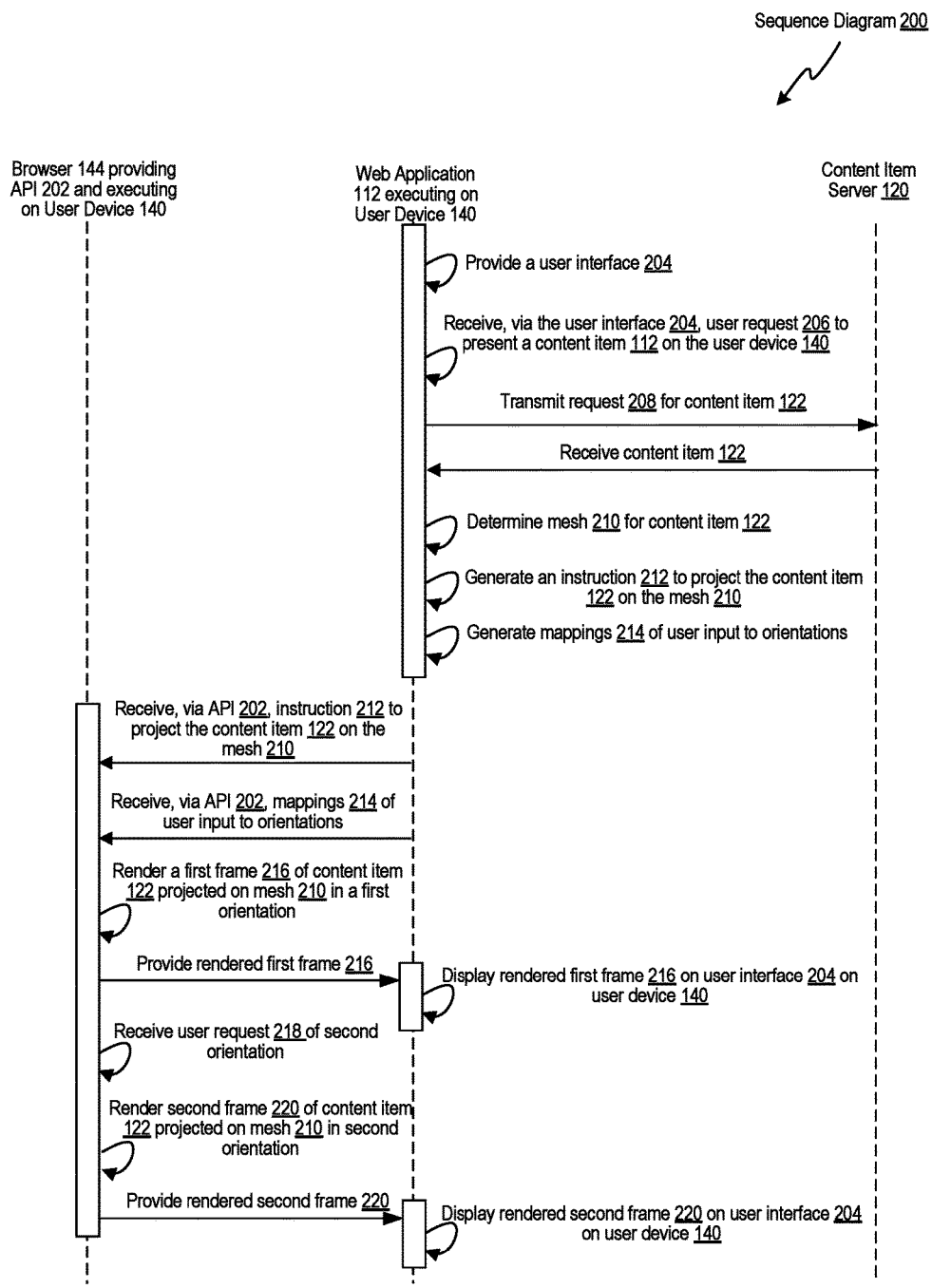
FIG. 2 is a sequence diagram for rendering a content item projected on a mesh, in accordance with an implementation of the disclosure.

FIG. 2 depicts a sequence diagram 200 for rendering a content item 122 projected on a mesh 210, in accordance with one or more aspects of the present disclosure. As depicted, the sequence diagram 200 includes interactions between the browser 144, web application 112, and content item server 120. The browser 144 may be providing an API 202 and executing on the user device 140. The browser 144 may receive a user request to launch web application 112, transmit a request for the web application 112 to the application distribution server 110, and receive high level programming code (e.g., JavaScript) from the application distribution server to execute the web application 112 on the user device 140. The interactions depicted in the sequence diagram 200 can occur in various orders and/or concurrently, and with other interactions not presented and described herein. Furthermore, not all illustrated interactions may be required to implement the sequences in accordance with the disclosed subject matter.

The sequence diagram 200 may begin with web application 112 providing a user interface 204 on the user device 140. In one implementation, the user interface 204 may allow a user to select a content item 122 to be projected on a mesh 210. For example web application 112 may allow a user to search for and provide playback of 360-degree content items, 3D content items, or 3D 360-degree content items. In another implementation, the user interface 204 may allow a user to navigate to a content item 122 to be projected on a mesh. For example, web application 112 may allow a user to navigate to a webpage representing a user interface that displays 3D UI elements.

The web application 112 may receive, via the user interface 204, a user request 206 to present a content item 122 on the user device 140. For example, the user request 206 may be to present a 360-degree video on the user device 140. In another example, the user request 206 may be to present a UI including 3D UI elements on the user device 140.

The web application 112 may transmit a request 208 for the content item 122 to the content item server 120. The content item server 120 may identify the content item 122 and transmit the content item 122 to the web application 112. In some implementations, the user device 140 may download the content item 122 from the content item server 120. In other implementations, the user device 140 may stream the content item 122 from the content item server 120 to the web application 112 (e.g., receive the content item 122 from the content item server 120 via a media stream).

The web application 112 determines a mesh 210 for the content item 122. Mesh 210 may be a 3D object. In one implementation, the mesh 210 is a sphere (e.g., a spherical mesh). In another implementation, the mesh 210 is a prism (e.g., a cube). In another implementation, mesh 210 is a cylinder. In another implementation, mesh 210 is a cone. In one implementation, a representation of the mesh 210 is embedded within a data header of content item 122. The web application 112 may receive the content item 122 from the content item server 120 and extract the representation of the mesh 210 from the content item 122. The web application may generate or obtain a mesh URL (e.g., obtain a local private URL for the mesh using a standard web API) for mesh 210. In another implementation, the high level programming code of the web application 112 may download the mesh 210 (unawares to the browser 144). Once the mesh is downloaded, the web application 112 may wrap the data for the mesh into a mesh URL.

In one implementation, the content item 122 projected on the mesh 210 is to be displayed via a single display (e.g., via a network-connected television device, via a computer monitor, via a screen of a smartphone or tablet, etc.) and the mesh 210 may be a single mesh. In another implementation, the content item 122 projected on the mesh 210 may be displayed via two or more displays and may include two or more meshes. For example, the rendered content item may be displayed via a headset (e.g., a virtual reality (VR) headset) that includes a first display for a left eye and a second display for a right eye. The content item 122 may be projected on a first mesh to be displayed to the left eye and may be projected on a second mesh to be displayed to the right eye, so that different scenes are rendered for different eyes.

The web application 112 may query the browser 144 to determine that the browser 144 is providing the API 202. The web application 112 may generate an instruction 212 to project the content item 122 on the mesh 210 in response to determining the browser 144 is providing the API 202. In some implementations, the web application 112 further generates mappings 214 of user input to orientations in response to determining the browser 144 is providing the API 202.

The browser 144 may receive, via API 202 from the web application 112, the instruction 212 to project the content item 122 on the mesh 210 (e.g., a declaration of a 3D or 360-degree scene, a definition of projecting the content item 122 on the mesh 210, a declaration to project the content item 122 on the mesh 210). In some implementations, the browser 144 may receive, via API 202 from the web application 112, mappings 214 of user input to orientations (e.g., a definition of user input to orientations, a declaration of user input to orientations, a declaration of key bindings to orientation movement). The API 202 may be used by one or more web applications 112 to interface with the browser 144 to enable rendered frames of content items 122 projected on a mesh 210.

The browser 144 may include an extension for declaring the mapping of a content item 122 to a mesh 210. The extension may include a filter (e.g., cascading style sheet (CSS) filter property, a map-to-mesh filter) that enables the browser 144 to render a content item 122 (e.g., styled element's web content) projected on the mesh 210. A map-to-mesh filter may enable an interface between the browser 144 and CSS. The filter may have the following CSS syntax: map-to-mesh( )=map-to-mesh(<mesh-spec>, <angle>{2}, <transform-function>[,<stereo-mode>])
<mesh-spec>=equirectangular|<uri>[<number> <number> <uri>]*

The parameter of <mesh-spec> may specify a mesh (e.g., a built-in equirectangular mesh, a list of binary-encoded mesh URLs, etc.). For example, the keyword of 'equirectangular' may cause a generated mesh for equirectangular projection to be applied. A default orientation of the mesh may be a forward vector pointing to the center of the content item 122 (e.g., the mapped texture), an up vector pointing to the top of the content item 122, and a right vector to the right of the content item 122. The content item 122 may be rendered as a texture on the inside surface of the 3D shape of the mesh 210. Any point on the 3D shape of the mesh 210 may be at least a meter away from the view from the default orientation (e.g., camera location). The view from any orientation may be from the center of the 3D shape of the mesh 210 (e.g., the center of a spherical mesh).

The parameter of <uri> may be a URL for a mesh 210 (e.g., a mesh object). If a mesh 210 does not exist, the filter may not be applied.

The parameter of [<number> <number> <uri>]* may include a list of meshes. Each mesh in the list of meshes may have a corresponding resolution. The filter may identify a mesh of the list of meshes that has a resolution that matches the resolution of content item 122. The first <number> may represent a width resolution match and the second <number> may represent a height resolution match. If no resolutions match, then the first non-optional <uri> may be used as default.

The parameter of <angle>{2} may include horizontal and vertical field of view angles. The field of view angles may be the extent of the content item 122 that is viewable at a given moment. For example, the field of view may be 100-degree horizontal and 60-degree vertical field of view.

The parameter of <transform-function> may be a 3D transform function that represents a world-view matrix (e.g., the view from an orientation, a view camera). In view space, (0,0,0) may be the origin, (0,0,−1) may be the forward vector, (0,−1,0) may be the up vector, and (1,0,0) may be the right vector. The coordinate system orientation may match the coordinate system orientation of CSS (e.g., description of how HTML elements are to be displayed on a user device).

The parameter of <stereo-mode> may be one of the following keywords: 'monoscopic,' 'stereoscopic-top-bottom,' or 'stereoscopic-left-right.' A monoscopic content item may have a single point of view (e.g., a 2D content item projected on a mesh). A stereoscopic content item may have a first content item for the left eye and a second content item for the right eye. By using two content items side by side, the stereoscopic content item gives a perception of depth (e.g., a 3D content item projected on a mesh). A top-bottom stereoscopic content item may display two images packed vertically. A left-right stereoscopic content item may display the two images packed horizontally.

The browser 144 may receive, via API 202, mappings 214 of user input to orientations (e.g., camera orientations) from the web application 112 via the API 202 (e.g., via a window, camera3D Web API). The browser 144 may include an interface definition language (IDL) interface (e.g., an IDL file) to control the direction of the orientation. The IDL file may enable an interface between the browser and the web application (e.g., the JavaScript) (whereas the map-to-mesh filter enables a different interface between the browser 144 and CSS). In one implementation, the IDL interface may include roll (e.g., rotating the view), pitch (e.g., moving the view up and down), and yaw (e.g., moving the view left and right) of the orientation. The roll may be from 0 degrees to 360 degrees. The pitch may be from −90 degrees to 90 degrees. The yaw may be from 0 degrees to 360 degrees. The browser 144, using the IDL interface and the mappings 214, may determine a mapping between a corresponding user input (e.g., a specified keyCode) and a corresponding orientation (e.g., a specified camera axis). While a key is pressed (e.g., a constant user input of left, right, up, or down), the orientation (e.g., the camera axis) may rotate at a constant rate (e.g., a constant degrees per second). The initial orientation may be (roll, pitch, yaw)=(0,0,0) which maps forward to (0,0,−1), up to (0,1,0), and right to (1,0,0). A right handed-coordinate system may be assumed.

Upon receiving the instruction 212, the browser 144 may execute the filter extension to render frames of the content item 122 projected on the mesh 210 based on the instructions 212. The browser 144 accesses a frame (e.g., a texture object representing a frame, a decoded video frame, a two-dimensional (2D) image) of a content item 122 identified by the web application 112 and apply the frame as a texture to an inner surface of the mesh 210 to generate a rendered frame. In some implementations, the frame may be a sub-webpage (e.g., a subpage, a lower level webpage in a website with the same main name as the starting level page plush a slash and text identifying the location of the subpage). In some implementations, the frame may be content referenced by a subdomain tree of a webpage (e.g., a subdivision of a website domain). In some implementations, the frame may be a portion of a webpage (e.g., a text block, an image, a user interface displayed on the GUI, a panel). For example, a portion of a webpage may be rendered into an image and the image may be applied as a texture to the mesh 210. The rendered portion of a webpage that is applied as texture on the mesh 210 may be used to implement a 3D web-based UI that has different panels suspended (e.g., floating around) in 3D space in different orientations. In some implementations, the browser 144 may rasterize each frame of the content item 122 identified by the web application 112 prior to applying each rasterized frame to a mesh 210 to generate a rendered frame.

The browser 144 may render a first frame 216 of the content item 122 projected on mesh 210 in a first orientation (e.g., a default orientation, a central portion of the content item 122). The orientation may correspond to a view angle from a location inside of the mesh (e.g., 3D object) to a portion of the content item applied to the inner surface of the mesh 210. The browser 144 may download or render the mesh 210 based on the instruction 212 (e.g., download the mesh URL and decode the mesh URL into a vertex buffer on the graphics processing unit (GPU)). The browser 144 may access the content item 122 based on the instruction 212.

In some implementations, the browser 144 renders the first frame 216 and displays the rendered first frame 216 on the user device 140. In some implementations, the browser 144 provides the rendered first frame 216 to the web application 112 and the web application displays the rendered first frame 216 on the user interface 204 on the user device 140. The content item 122 may have dimensions that are greater than the dimensions of the user interface 204. For example, the content item 122 may have a height that is three times greater than a height of the user interface 204 and a width that is 3.6 times greater than the width of the user interface 204. The orientation may refer to a portion of the content item 122 that is displayed via the user interface 204 (e.g., first orientation may refer to a central portion of the content item 122). The web application 112 may receive the content item 122 via a media stream and the rendering, by the browser 144, of the first frame 216 may be during the streaming of a portion of the media stream. The browser 144 may render the first frame 216 using a thread that is different than the thread used to execute the web application 112.

The browser 144 may receive a user request 218 of a second orientation. In one implementation, the user request 218 is an analog key (e.g., thumbstick movement) mapped to an orientation axis (e.g., camera axis) and change in orientation (e.g., camera movement) is scaled according to the analog value. In another implementation, the user request 218 is a digital key (e.g., left, right, up, down arrows) mapped to an orientation axis (e.g., camera axis) and change in orientation (e.g., camera movement) will move at a constant rate (e.g., degrees per second) as long as the digital key is pressed. In another implementation, the user request 218 is an input of a new orientation (e.g., 90-degrees to the left of the first orientation, 180-degrees to the left of the first orientation). The browser 144 may request an orientation update for each frame (e.g., query whether the user device 140 has received a user request of a new orientation that is different than the current orientation). Orientation updates may equal the refresh rate of the display (e.g., the frame rate).

In one implementation, the user requests of a change in orientation may include a form of momentum to be applied to the new rendered frames (e.g., camera adjustments). The orientation of the rendered frames may change in response to receiving user requests of new orientations (e.g., analog input, digital input) and, in response to the user requests of new orientations ceasing, the change in orientation of the rendered frames may slow down and come to rest. In another implementation, change in orientation of the rendered frames matches each user request without applying a form of momentum to the new rendered frames.

In some implementations, the mappings 214 include a dead zone or flat range proximate to the default orientation (e.g., similar to the dead zone or flat range near the center of analog thumbsticks). User input may be ignored in the dead zone or flat range to avoid noise. The mappings 214 may map user input to orientations continuously from an edge of the flat range to the extent of the user input.

In one implementation, the browser 144 renders a second frame 220 of the content item 122 projected on the mesh 210 in the second orientation. The browser 144 causes the rendered second frame to be displayed on the user device 140 (e.g., the browser 144 displays the rendered second frame 220 on the user device 140, the browser 144 provides the rendered second frame 220 to the web application 112 and the web application 112 displays the rendered second frame 220 on the user interface 204 on the user device 140). The browser 144 may generate the rendered frames of the content item 122 projected on the mesh 210 based on the instruction 212 and the mappings 214 without receiving additional instructions and without receiving additional mappings from the web application 112 (e.g., the mappings 214 are called once to initialize the mapping, after which the browser 144 updates the orientations based on user input).

In another implementation, the browser 144 transmits the user request 218 of a second orientation to the web application 112 and the web application 112 provides the adjustment to the orientation (e.g., the web application renders the second frame 220 of content item 122 projected on the mesh 210 in the second orientation). The web application 112 may transmit an updated instruction to project the content item 122 on the mesh in the second orientation to the browser 144. The browser 144 may render the second frame 220 using a thread that is different than the thread used to execute the web application 112.

In one implementation, the first frame 216 and the second frame 220 are rendered by the browser 144 from two different view angles of a 360-degree video. In another implementation, the first frame 216 and the second frame 220 are rendered by the browser 144 from two different view angles of a UI that has at least one dimension that is greater than a corresponding dimension of the user interface 204. For example, a UI may include a panel of auxiliary tools or widgets that, during default orientation, are off-screen to the left of the user interface 204. Upon user input (e.g., left toggle, left arrow, etc.), the browser may render a second frame in a second orientation that includes the panel that was previously off-screen. In another implementation, the first frame 216 and the second frame are rendered by the browser 144 of two different orientations of a 3D UI element. For example an object (e.g., a figurine, an avatar, a representation of the user) may be in a default orientation in a rendered first frame 216. Upon user input (e.g., left toggle, left arrow), the object may be in second orientation (e.g., rotated to the left) in a rendered second frame 220.

Figure 3A:
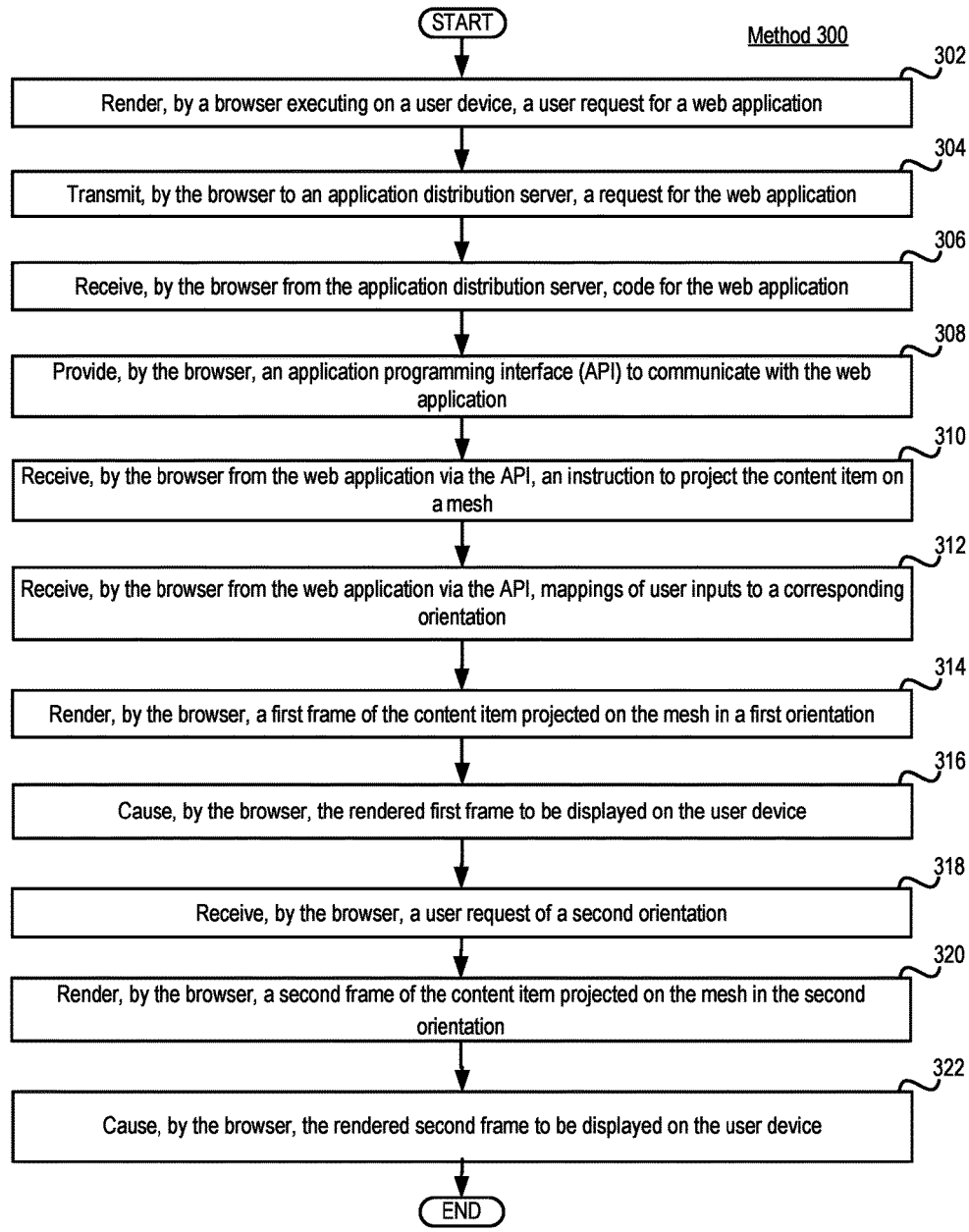
FIGS. 3A-B are flow diagrams illustrating example methods of providing rendered frames of a content item projected on a mesh, in accordance with an implementation of the disclosure.
Figure 3B:
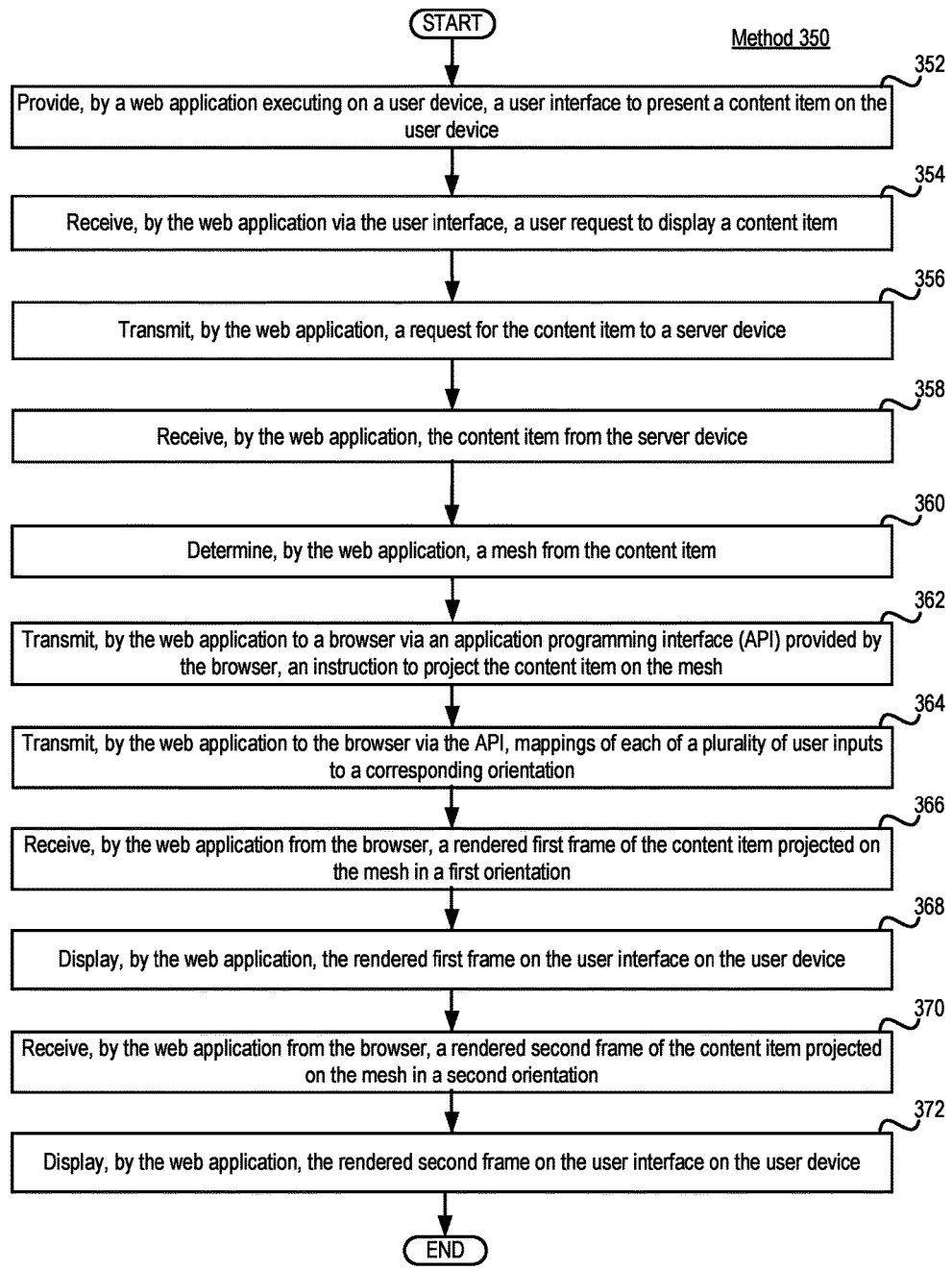

FIGS. 3A-B depict flow diagrams for illustrative examples of methods 300 and 350 for providing rendered frames of a content item 122 projected on a mesh 210. Method 300 is an example method from the perspective of a browser 144 and method 350 is an example method from the perspective of a web application 112. Methods 300 and 350 may be performed by processing devices that may include hardware (e.g., circuitry, dedicated logic), software (such as is run on a general purpose computer system or a dedicated machine), or a combination of both. Methods 300 and 350 and each of their individual functions, routines, subroutines, or operations may be performed by one or more processors of the computer device executing the method. In certain implementations, methods 300 and 350 may each be performed by a single processing thread. Alternatively, methods 300 and 350 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. For example, a non-transitory machine-readable storage medium may store instructions which, when executed, cause a processing device (e.g., of a user device 140, etc.) to perform operations including methods disclosed within. In one implementation, method 300 may be performed by a browser 144 executing on user device 140 of FIG. 1 and method 350 may be performed by a web application executing on the user device 140 of FIG. 1.

Referring to FIG. 3A, method 300 may be performed by one or more processing devices of user device 140 for providing rendered frames of a content item projected on a mesh. For example, method 350 may be performed by a browser 144 executing on the one or more processing devices.

Method 300 may begin at block 302 where the processing device may receive, by a browser 144 executing on a user device 140, a user request for a web application 112. In one implementation, receiving the user request for the web application 112 includes receiving a URL for the web application 112 that is entered in the browser 144. In another implementation, the receiving the user request for the web application 112 includes receiving a user selection of a representation (e.g., an icon, a shortcut, link) of the web application 112.

At block 304, the processing device may transmit, by the browser 144 to an application distribution server 110, a request (e.g., the user request) for the web application 112. The transmitting of the request may include transmitting the URL for the web application 112 to the application distribution server 110.

At block 306, the processing device may receive, by the browser 144 from the application distribution server 110, code (e.g., high level programming code, JavaScript) for the web application 112. The browser 144 may launch the web application 112 on the user device 140 using the code received from the application distribution server 110. Once launched, the web application 112 may obtain additional content (e.g., JavaScript, images, content items, etc.) from the application distribution server 110. The web application 112 may include a user interface 204. The user interface 204 may receive user input requesting presentation of a content item 122 projected on a mesh (e.g., playback of a 360-degree video, 3D rendering of a scene including a 3D UI element, presentation of a 3D 360-degree content item, etc.) on the user device 140.

At block 308, the processing device may provide, by the browser 144, an API 202 to communicate with the web application 112.

At block 310, the processing device may receive, by the browser 144 from the web application 112 via the API 202, an instruction 212 to project the content item 122 on a mesh 210. The instruction may identify the content item 122 and the mesh 210. The content item 122 may be an incoming stream of video data received by the web application 112. In one implementation, the web application 112 may forward the incoming stream of video data to the browser as the incoming stream of video data is received from a content item server 120. In another example, the web application 112 may identify the incoming stream of video data and provide an identifier of the incoming stream of video data to the browser 144. An identifier (e.g., representation) of the mesh 210 may be embedded within the header of the content item 122. The web application 112 may extract the identifier of the mesh 210 from the content item 122 and generate a mesh URL for the mesh 210 (e.g., obtain a local private URL for the mesh data). The instruction 212 received by browser 144 may identify the mesh 210 by identifying the mesh URL for the mesh 210.

At block 312, the processing device may receive, by the browser 144 from the web application 112 via the API 202, mappings 214 of user inputs (e.g., each of a plurality of user inputs via the user device 140) to a corresponding orientation. The user inputs may include an analog input, a digital input, an input of an angle, etc. The mappings 214 may include instructions to project the content item 122 on the mesh 210 in a corresponding orientation for each respective user input.

At block 314, the processing device may render, by the browser 144, a first frame 216 of the content item 122 projected on the mesh 210 in a first orientation. The processing device may render the first frame 216 without involvement of the web application 112 (may render the first frame 216 using a different thread than the thread used to execute the web application 112). For example, the processing device may render the first frame using the more efficient programming language of the browser 144 (e.g., C++) instead of the less efficient programming language (e.g., JavaScript) of the web application 112.

At block 316, the processing device may cause, by the browser 144, the rendered first frame 216 to be displayed on the user device 140. In one implementation, the browser 144 may render the first frame 216 to the user device 140. In another implementation, the browser 144 may transmit the rendered first frame 216 to the web application 112 and the web application 112 may display the rendered first frame 216 on the user interface 204 on the user device. The web application 112 may provide the user interface 204 without generating the rendered frames of the content item 122.

At block 318, the processing device may receive, by the browser 144, a user request 218 of a second orientation. In one implementation, the user request 218 is a toggle (e.g., left, right, up, down) received via a user input device (e.g., a keyboard, a touchpad, a mouse, a touch screen, thumbsticks, television remote, a game pad on a gaming console, etc.). In another implementation, the user request 218 is a change in orientation of a headset. For example, a headset may be attached to the head of a user and as the user provides a movement of the head of the user, the user request 218 may be a request to change the orientation of the rendered content item to mirror the movement of the head of the user. The browser 144 may receive the user request 218 without the web application 112 being aware of the user request 218 (e.g., the browser 144 may be directly linked to the input device, the web application 112 may not receive the user request 218 of a second orientation). The processing device may determine, by the browser 144 based on the mappings 214, that the user request 218 corresponds to a second orientation that is different from the first orientation.

At block 320, the processing device may render, by the browser 144, a second frame 220 of the content item 122 projected on the mesh 210 in the second orientation. The processing device may render the second frame 220 using a different thread than the thread used to execute the web application 112.

At block 322, the processing device may cause, by the browser 144, the rendered second frame 220 to be displayed on the user device 140.

Referring to FIG. 3B, method 350 may be performed by one or more processing devices of user device 140 for providing rendered frames of a content item projected on a mesh. For example, method 350 may be performed by a web application 112 executing on the one or more processing devices.

Method 350 may begin at block 352 where the processing device may provide, by a web application 112 executing on a user device 140, a user interface 204 to present a content item 122 on the user device 140. In one implementation, the user interface 204 may provide an interface for searching for and performing playback of content items 122. In another implementation, the user interface 204 may present a content item 122 representing a UI that contains one or more 3D UI elements (e.g., a figurine, an avatar, a representation of the user, etc.).

At block 354, the processing device may receive, by the web application 112 via the user interface 204, a user request 206 to display a content item 122. For example, the user request 206 may be a selection of a 360-degree content item, a UI that includes 3D UI elements, etc.

At block 356, the processing device may transmit, by the web application 112, a request 208 for the content item 122 to a server device (e.g., content item server 120) and at block 358, the processing device may receive, by the web application 112, the content item 122 from the server device (e.g., content item server 120). In one implementation, the content item 122 is an incoming stream of data (e.g., video data).

At block 360, the processing device may determine, by the web application 112, a mesh 210 for the content item 122. In one implementation, the web application 112 extracts an identifier of a mesh 210 that is embedded within a header of the content item 122. In another implementation, the web application 112 downloads the mesh 210 (e.g., from content item server 120, from a mesh server, etc.). The web application 112 may generate or obtain a mesh URL for the mesh (e.g., wrap the mesh 210 into a mesh URL).

At block 362, the processing device may generate and transmit, by the web application 112 to the browser 144 via an API 202 provided by the browser 144, an instruction 212 to project the content item 122 on the mesh 210. The instruction 212 may identify the content item 122 and the mesh 210. For example, the instruction 212 may include the mesh URL for the mesh 210. In one implementation, as the web application 112 receives the incoming stream of data (e.g., video data) of the content item 122 and the web application forwards or identifies the incoming stream of data to the browser 144 (e.g., as the incoming stream of video data is received).

At block 364, the processing device may transmit, by the web application 112 to the browser 144 via the API 202, mappings 214 of user inputs to orientations. The web application 112 may determine mappings 214 based on the content item 122, the mesh 210, and the user interface 204.

In some implementations, subsequent to transmitting the instruction 212 and the mappings 214, the browser 144 renders frames of the content item 122 projected on the mesh 210 and displays the rendered frames on the user device without any involvement of the web application 112. In some implementations, the web application 112 identifies the stream of content item 122 to browser 144 as the web application 112 receives the stream from the content item server 120 while the browser 144 generates and renders the rendered frames. In some implementations, the web application 112 displays the user interface 204 and provides functionalities (e.g., messaging, scrolling, purchasing, playback, etc.) through the user interface 204 while the browser 144 generates and displays the rendered frames.

In some implementations, subsequent to the browser 144 generating a rendered frame, the web application 112 receives the rendered frame from the browser 144 and displays the rendered frame on the user interface 204 on the user device 140.

In some implementations, at block 366, the processing device may receive, by the web application 112 from the browser 144, a rendered first frame 216 of the content item 122 projected on the mesh 210 in a first orientation and at block 368, the processing device may display, by the web application 112, the rendered first frame 216 on the user interface 204 on the user device 140. The first frame 216 may be rendered in the first orientation without involvement of the web application 112 (the first frame 216 may be rendered using a different thread than the thread used to execute the web application 112).

In some implementations, at block 370, the processing device may receive, by the web application 112 from the browser 144, a rendered second frame 220 of the content item 122 projected on the mesh 210 in a second orientation and at block 372, the processing device may display, by the web application 112, the rendered second frame 220 on the user interface 204 on the user device 140. The second frame 220 may be rendered in the second orientation without involvement of the web application 112 (the second frame 220 may be rendered using a different thread than the thread used to execute the web application 112.

Figure 4:
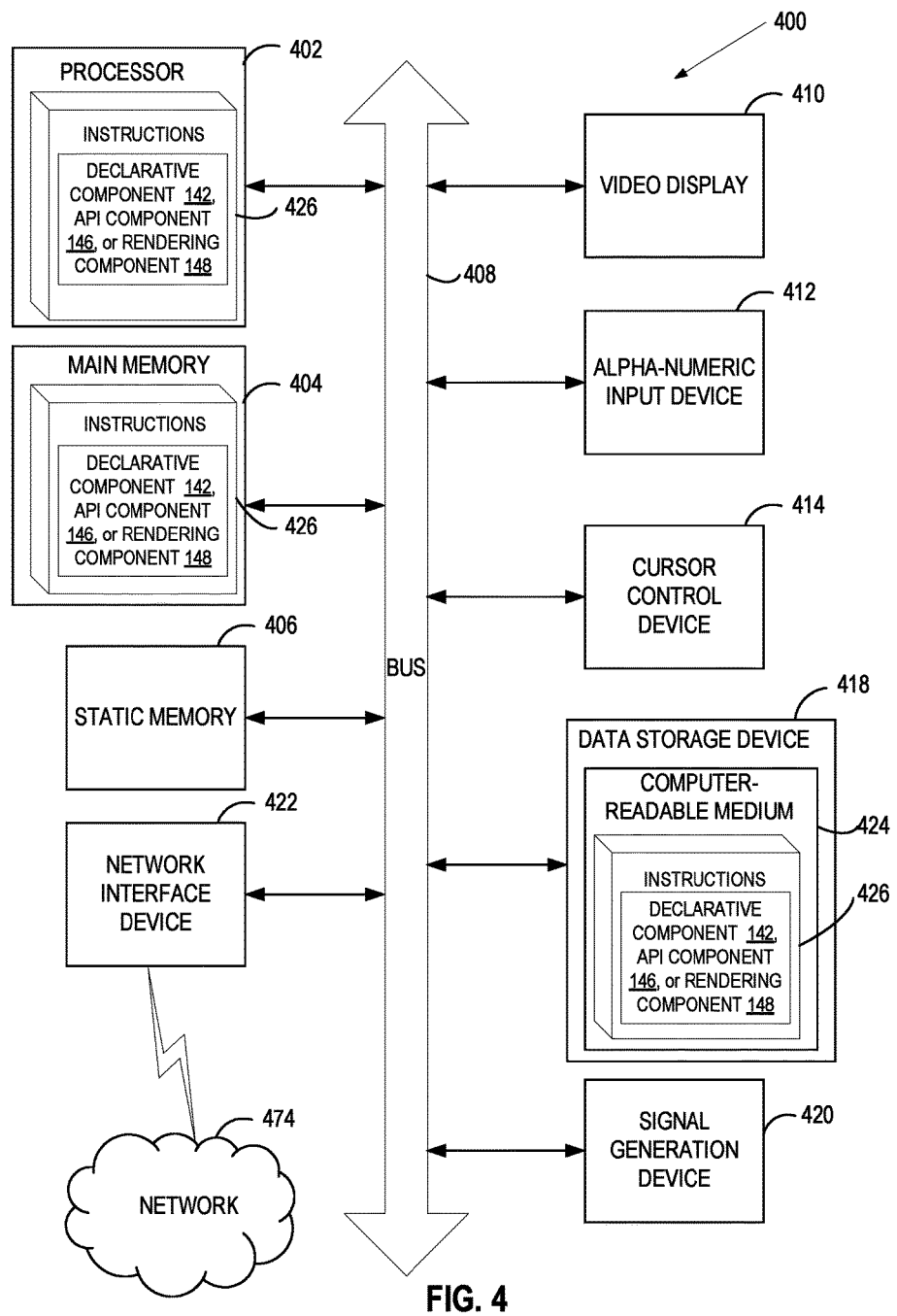
FIG. 4 is a block diagram illustrating one implementation of a computer system, in accordance with an implementation of the disclosure.

FIG. 4 is a block diagram illustrating one implementation of a computer system, in accordance with an implementation of the disclosure. In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alpha-numeric input device 412 (e.g., a keyboard), a cursor control device 414 (e.g., a mouse), and a signal generation device 420.

Data storage device 416 may include a non-transitory computer-readable storage medium 424 on which may store instructions 426 encoding any one or more of the methods or functions described herein, including instructions encoding the declarative component 142, API component 146, or rendering component 148 of FIG. 1 and for implementing methods 300 or 350.

Instructions 426 may also reside, completely or partially, within volatile memory 404 and/or within processing device 402 during execution thereof by computer system 400, hence, volatile memory 404 and processing device 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "providing," "receiving," "rendering," "causing," "determining," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300, method 350, and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
providing, by a browser executing on a user device, an application programming interface (API) to communicate with a web application that includes a user interface to present a content item on the user device;
receiving, by the browser from the web application via the API, an instruction to project the content item on a mesh, wherein the instruction identifies the content item and the mesh;
rendering, by the browser and without involvement of the web application, a first frame of the content item projected on the mesh in a first orientation, wherein the rendering of the first frame comprises applying, by the browser, the content item to the mesh; and
causing, by the browser, the rendered first frame to be displayed on the user device.

2. The method of claim 1 further comprising:
receiving, by the browser from the web application via the API, mappings of each of a plurality of user inputs to a corresponding orientation;
receiving, by the browser without the involvement of the web application, user input;
determining, by the browser based on the mappings, that the user input corresponds to a second orientation that is different from the first orientation;
rendering, by the browser without the involvement of the web application, a second frame of the content item projected on the mesh in the second orientation; and
causing, by the browser, the rendered second frame to be displayed on the user device.

3. The method of claim 1, wherein the user device is a network-connected television device.

4. The method of claim 2, wherein the first frame and the second frame are displayed via a virtual reality headset and the user input is received via a change in orientation of the virtual reality headset.

5. The method of claim 1, wherein the content item is 360-degree video captured by a 360-degree video camera.

6. The method of claim 1, wherein the content item comprises one or more three-dimensional (3D) UI elements and the rendering of the first frame comprises 3D rendering of a scene comprising the one or more 3D UI elements.

7. The method of claim 1, wherein:
the mesh comprises a three-dimensional object;
the applying of the content item to the mesh comprises applying, by the browser, the content item onto an inner surface of the three-dimensional object; and
the first orientation corresponds to a view angle from a location inside of the three-dimensional object to a portion of the content item applied to the inner surface of the mesh.

8. A non-transitory machine-readable storage medium storing instructions which, when executed cause a processing device of a user device to perform operations comprising:
providing, by a web application hosted by a browser executing on the user device, a user interface to present a content item on the user device;
receiving, by the web application from a server, the content item;
determining, by the web application, a mesh from the content item; and
transmitting, by the web application to the browser via an application programming interface (API) provided by the browser, an instruction to project the content item on the mesh, wherein the instruction identifies the content item and the mesh, wherein the browser is to:
render a first frame of the content item projected on the mesh in a first orientation without involvement of the web application, wherein rendering of the first frame comprises applying, by the browser, the content item to the mesh; and
cause the rendered first frame to be displayed on the user device.

9. The non-transitory machine-readable storage medium of claim 8, wherein the operations further comprise transmitting, by the web application to the browser, mappings of each of a plurality of user inputs to a corresponding orientation, wherein the browser is to:
receive a user input without the involvement of the web application;
determine that the user input corresponds to a second orientation that is different from the first orientation;
render a second frame of the content item projected on the mesh in the second orientation without the involvement of the web application; and
cause the rendered second frame to be displayed on the user device.

10. The non-transitory machine-readable storage medium of claim 9, wherein:
the mesh comprises a three-dimensional object;
the applying of the content item to the mesh comprises applying, by the browser, the content item onto an inner surface of the three-dimensional object; and
the first orientation corresponds to a view angle from a location inside of the three-dimensional object to a portion of the content item applied to the inner surface of the mesh.

11. The non-transitory machine-readable storage medium of claim 9, wherein the receiving, by the web application, of the content item from the server is via a media stream, wherein the rendering, by the browser, of the first frame is during streaming of a portion of the media stream.

12. The non-transitory machine-readable storage medium of claim 9, wherein a representation of the mesh is embedded in the content item, the determining of the mesh comprises extracting, by the web application, an identifier of the mesh from the content item and generating, by the web application based on the identifier of the mesh, a mesh uniform resource locator (URL), wherein the transmitting of the instruction comprises transmitting, by the web application, the mesh URL to the browser.

13. The non-transitory machine-readable storage medium of claim 9, wherein the determining of the mesh comprises downloading, by the web application, the mesh and generating, by the web application, a mesh uniform resource locator (URL) to represent the mesh, wherein the transmitting of the instruction comprises transmitting, by the web application, the mesh URL to the browser.

14. The non-transitory machine-readable storage medium of claim 9, wherein the operations further comprise querying the browser to determine whether the browser is providing the API, wherein the transmitting of the instruction is in response to determining that the browser is providing the API.

15. A system comprising:
a memory to store instructions; and
a processing device communicably coupled to the memory, the processing device to execute the instructions to:
provide, by a browser executing on a user device, an application programming interface (API) to communicate with a web application that includes a user interface to present a content item on the user device;

receive, by the browser from the web application via the API, an instruction to project the content item on a mesh, wherein the instruction identifies the content item and the mesh;

render, by the browser and without involvement of the web application, a first frame of the content item projected on the mesh in a first orientation, wherein rendering of the first frame comprises applying, by the browser, the content item to the mesh; and cause, by the browser, the rendered first frame to be displayed on the user device.

16. The system of claim 15, wherein the processing device is further to:

receive, by the browser from the web application via the API, mappings of each of a plurality of user inputs to a corresponding orientation;

receive, by the browser without the involvement of the web application, user input;

determine, by the browser based on the mappings, that the user input corresponds to a second orientation that is different from the first orientation;

render, by the browser without the involvement of the web application, a second frame of the content item projected on the mesh in the second orientation; and cause, by the browser, the rendered second frame to be displayed on the user device.

17. The system of claim 15, wherein the user device is a network-connected television device.

18. The system of claim 15, wherein the content item is a 360-degree video captured by a 360-degree video camera.

19. The system of claim 15, wherein the content item comprises one or more three-dimensional (3D) UI elements and the rendering of the first frame comprises 3D rendering of a scene comprising the one or more 3D UI elements.

20. The system of claim 15, wherein:

the mesh comprises a three-dimensional object;

the applying of the content item to the mesh comprises applying, by the browser, the content item onto an inner surface of the three-dimensional object; and the first orientation corresponds to a view angle from a location inside of the three-dimensional object to a portion of the content item applied to the inner surface of the mesh.

* * * * *